United States Patent Office.

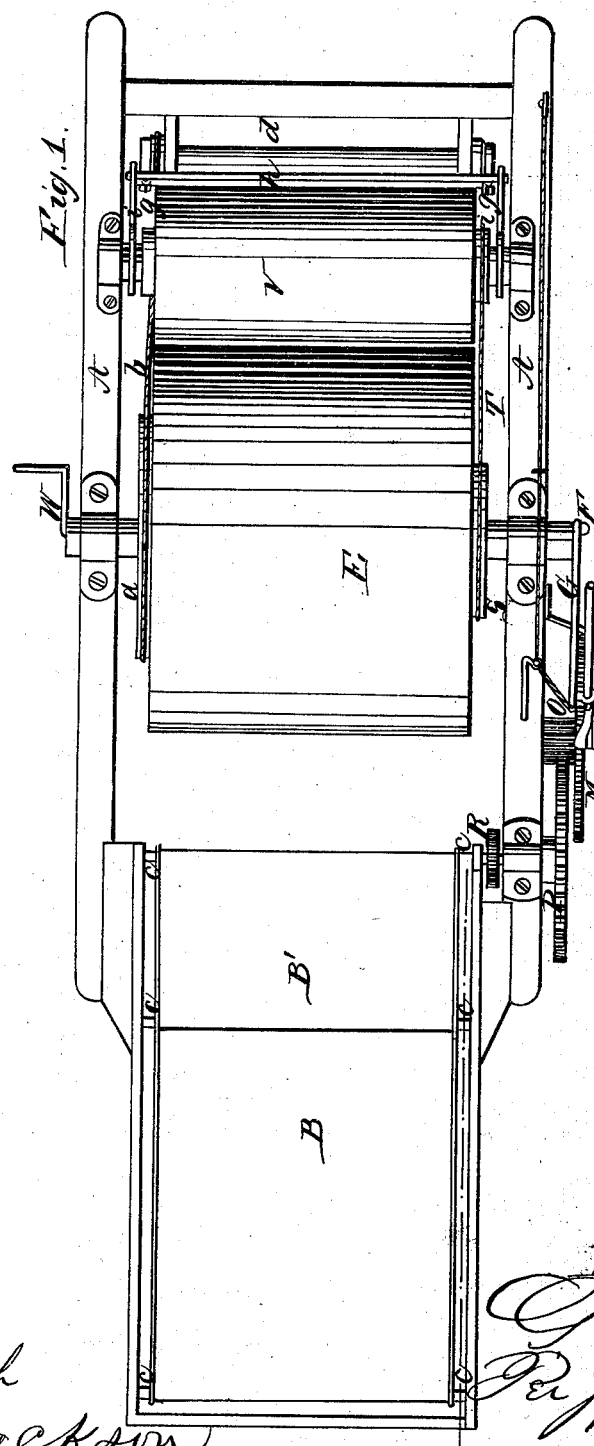

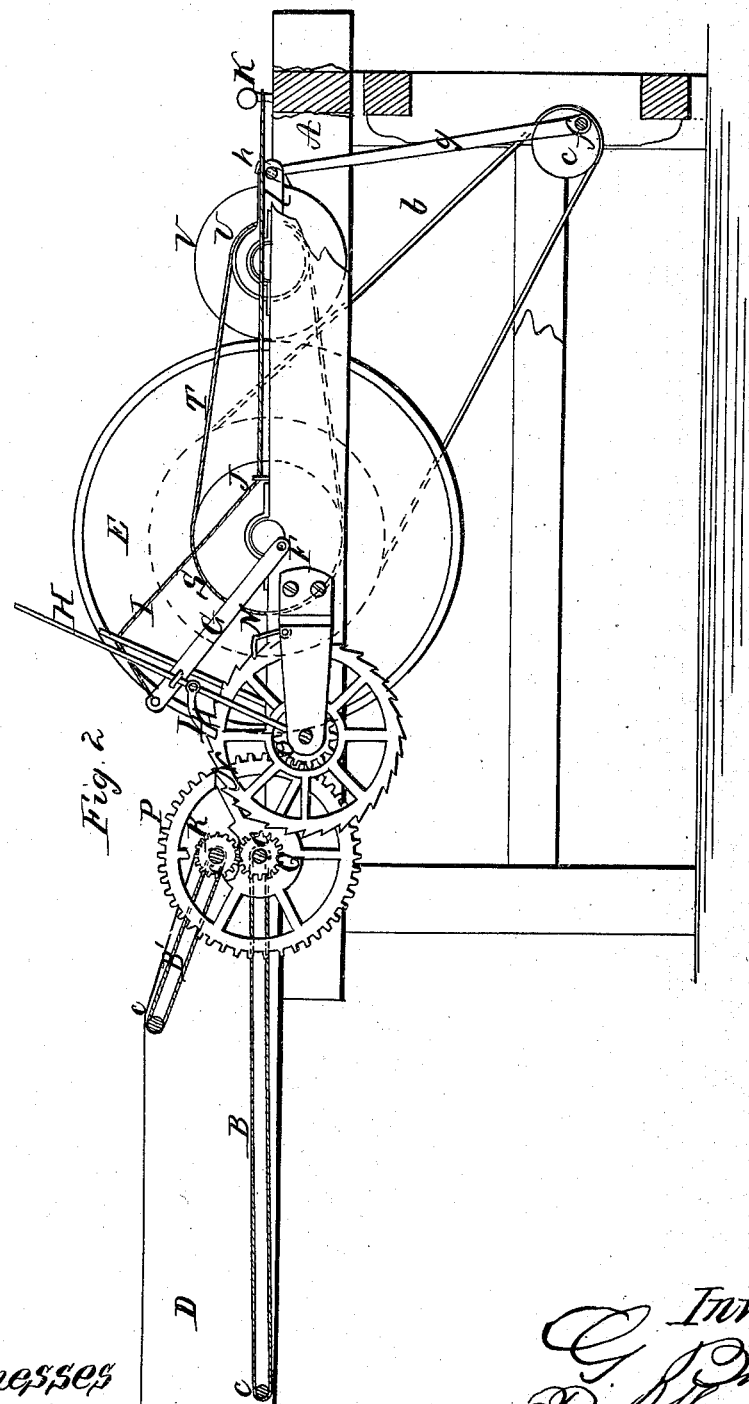

IMPROVEMENT IN FEEDING DEVICES FOR CARDING ENGINES.

GEORGE BRUCE, OF CORYDON, INDIANA.

Letters Patent No. 60,338, dated December 11, 1866.

---

The Schedule referred to in these Letters Patent and making part of the same.

---

TO ALL WHOM IT MAY CONCERN:

Be it known that I, GEORGE BRUCE, of Corydon, Harrison county, and State of Indiana, have invented a new and useful Improvement in Roll-Carding Machines; and I do hereby declare that the following is a full, clear, and exact description thereof, which will enable others skilled in the art to make and use the same, reference being had to the accompanying drawing, forming part of this specification.

The nature of my invention relates to a valuable improvement in roll-carding machines. It principally consists in the simplicity and novelty of the feed works, they being so constructed as to be nearly automatic in their operation, in spreading and feeding the wool from the apron to the machine, with but little aid and assistance, while to feed by the common device, requires the constant attendance of the operator to spread and regulate the feed of wool from the apron to the machine. By my invention, this difficulty is obviated by the fact, that it may be regulated so as to feed fast or slow as the nature of the material may require.

To enable others skilled in the art, to make and use my invention, I will proceed to describe its construction and operation.

Figure 1 is a top plan view of my improved roll-carding machine.
Figure 2 is a side elevation of the same.
Letters of like name and kind refer to like parts in each of the figures.

A is a rectangular frame, made of wood or other material, upon which is placed the machinery of my roll-carding device. B and B' are aprons, both of which are attached to and run round rollers or shafts, $c\ c\ c\ c$, the said shafts are attached and work in the apron box, D, which is rigidly secured to the front end of the frame, A. Upon the end of the shaft of the cylinder E, is a crank F, to which is attached a pitman, G, which is connected to the lever, H. At the top of this pitman G, is attached a cord, I, which passes back through the eye, J, and attached to the key, K. To the lever H, is connected a pawl, L, which works in the ratchet-wheel, M. In the ratchet-wheel also works the follower, N. Upon the shaft of the ratchet-wheel M, is a small pinion-wheel, O, which meshes into the toothed wheel, P, upon the shaft of which is another pinion, Q, that meshes into a corresponding pinion, R, which is secured upon the shaft C, that carries the apron, B. Upon the end of the cylinder E is a pulley, S, around which a band, T, works over another pulley, U, upon the end of the cylinder V. Upon the end of the shaft of the cylinder E is a crank, W, also another band-wheel, $a$, around which the band $b$ passes and over the band-wheel $c$, which is upon the shaft $d$. To these band-wheels are crank pins, $f\ f$, one at each end of the said shaft. To each of the crank pins $f$ are connected the pitmen $g\ g$, which are also connected to the crank $h$, which are attached to pendent levers, $i\ i$, which have a bearing upon each end of the shaft of the cylinder V.

The operation consists simply in supplying power to the crank W, which puts in motion the cylinder E, from which motion is given through the medium of pitman G and pawl L to the ratchet-wheel M, from which motion is imparted to the toothed wheel P and aprons B and B', through the medium of the pinion Q. Motion is also imparted to the doffer crank from the cylinder E through the medium of the band $b$ and pitman $g$. Now it will be seen that as the wool is laid upon the apron B it is fed along under the apron B', and is spread out in a suitable manner to enter the machine. It will also be noticed that the feed of wool to the machine may be varied as desired by means of the key K and cord J. When the feed is required to be slow, by turning up the cord J around the key K it reduces or shortens the stroke of the pawl L, which reduces the feed just in proportion as the stroke of the pawl is reduced. By the motion of the comb the doffing cylinder V is kept clean, and relieved from any fibrous substance that may adhere thereto.

Having thus described my invention, what I claim as new, and desire to secure by Letters of the United States, is—

1. The pitman G, pawl L, ratchet-wheel M, toothed wheels O P, and pinions Q and R, in combination with the aprons B and B', for the purpose and substantially as herein described.

2. I claim the manner of accelerating or reducing the feed by lengthening or shortening the stroke of the pawl L by means of the lever G and cord J, substantially as herein set forth.

GEORGE BRUCE.

Witnesses:
SAMUEL B. LUCKETT,
LOUIS RUHMHAUSEN.